(12) United States Patent
Gladwin et al.

(10) Patent No.: US 7,818,518 B2
(45) Date of Patent: *Oct. 19, 2010

(54) SYSTEM FOR REBUILDING DISPERSED DATA

(75) Inventors: S. Christopher Gladwin, Chicago, IL (US); Matthew M. England, Chicago, IL (US); Dhavi Gopala Krishna Kapila Lakshmana Harsha, Chicago, IL (US); Zachary J. Mark, Chicago, IL (US); Vance T. Thornton, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,166

(22) Filed: Apr. 28, 2009

(65) Prior Publication Data

US 2009/0254720 A1    Oct. 8, 2009

Related U.S. Application Data

(63) Continuation of application No. 11/403,391, filed on Apr. 13, 2006, now Pat. No. 7,546,427, which is a continuation-in-part of application No. 11/241,555, filed on Sep. 30, 2005.

(51) Int. Cl.
    *G06F 12/12*   (2006.01)
(52) U.S. Cl. ........................ 711/154; 711/156
(58) Field of Classification Search .................. 711/154
    See application file for complete search history.

(56) References Cited

U.S. PATENT DOCUMENTS

2006/0156059 A1 * 7/2006 Kitamura ...................... 714/6

* cited by examiner

*Primary Examiner*—Jack A Lane
(74) *Attorney, Agent, or Firm*—Garlick Harrison & Markison; Timothy W. Markison

(57) ABSTRACT

A digital data file storage system is disclosed in which original data files to be stored are dispersed using some form of information dispersal algorithm into a number of file "slices" or subsets in such a manner that the data in each file share is less usable or less recognizable or completely unusable or completely unrecognizable by itself except when combined with some or all of the other file shares. These file shares are stored on separate digital data storage devices as a way of increasing privacy and security. As dispersed file shares are being transferred to or stored on a grid of distributed storage locations, various grid resources may become non-operational or may operate below at a less than optimal level. When dispersed file shares are being written to a dispersed storage grid which not available, the grid clients designates the dispersed data shares that could not be written at that time on a Rebuild List. In addition when grid resources already storing dispersed data become non-available, a process within the dispersed storage grid designates the dispersed data shares that need to be recreated on the Rebuild List. At other points in time a separate process reads the set of Rebuild Lists used to create the corresponding dispersed data and stores that data on available grid resources.

10 Claims, 17 Drawing Sheets

| Node0 | Node1 | Node2 | Node3 | Node4 | Node5 | Type | Offset |
|---|---|---|---|---|---|---|---|
| X |   |   |   |   |   | 1 | 0 |
|   | X |   |   |   |   | 1 | 1 |
| X | X |   |   |   |   | 1 | 0 |
|   |   | X |   |   |   | 1 | 2 |
| X |   | X |   |   |   | 2 | 0 |
|   | X | X |   |   |   | 1 | 1 |
| X | X | X |   |   |   | 1 | 0 |
|   |   |   | X |   |   | 1 | 3 |
| X |   |   | X |   |   | 3 | 0 |
|   | X |   | X |   |   | 2 | 1 |
| X | X |   | X |   |   | 2 | 0 |
|   |   | X | X |   |   | 1 | 2 |
| X |   | X | X |   |   | 3 | 2 |
|   | X | X | X |   |   | 1 | 1 |
|   |   |   |   | X |   | 1 | 4 |
| X |   |   |   | X |   | 2 | 4 |
|   | X |   |   | X |   | 3 | 1 |
| X | X |   |   | X |   | 3 | 0 |
|   |   | X |   | X |   | 2 | 2 |
| X |   | X |   | X |   | 4 | 0 |
|   | X | X |   | X |   | 2 | 1 |
|   |   |   | X | X |   | 1 | 3 |
| X |   |   | X | X |   | 2 | 3 |
|   | X |   | X | X |   | 3 | 3 |
|   |   | X | X | X |   | 1 | 2 |
|   |   |   |   |   | X | 1 | 5 |
| X |   |   |   |   | X | 1 | 5 |
|   | X |   |   |   | X | 2 | 5 |
| X | X |   |   |   | X | 1 | 5 |
|   |   | X |   |   | X | 3 | 2 |
| X |   | X |   |   | X | 2 | 5 |
|   | X | X |   |   | X | 3 | 1 |
|   |   |   | X |   | X | 2 | 3 |
| X |   |   | X |   | X | 3 | 5 |
|   | X |   | X |   | X | 4 | 1 |
|   |   | X | X |   | X | 2 | 2 |
|   |   |   |   | X | X | 1 | 4 |
| X |   |   |   | X | X | 1 | 4 |
|   | X |   |   | X | X | 2 | 4 |
|   |   |   | X | X | X | 1 | 3 |

FIG. 5

| Outage Type Num | Decode Operation | Decoded data |
|---|---|---|
| 1 | decode1 | d[0+offset]=c3d(2, 3, 4, offset) |
| 1 | decode2 | d[1+offset]=c3d(3, 4, 5, offset) |
| 2 | decode1 | d[0+offset]=c3d(5, 1, 3, offset) |
| 2 | decode2 | d[2+offset]=c3d(1, 3, 5, offset) |
| 3 | decode1 | d[0+offset]=c3d(4, 2, 5, offset) |
| 3 | decode2 | d[3+offset]=c3d(1, 2, 5, offset) |

FIG. 6

| Outage Type Num | Decode Operation | Decoded data |
|---|---|---|
| 1 | decode1 | d[1+offset]=c3d(3, 4, 5, offset) |
| 1 | decode2 | d[0+offset]=c3d(5, 1, 3, offset) |
| 1 | decode3 | d[2+offset]=c3d(4, 5, 0, offset) |
| 2 | decode1 | d[0+offset]=c3d(4, 5, 2, offset) |
| 2 | decode2 | d[3+offset]=c3d(2, 4, 0, offset) |
| 2 | decode3 | d[1+offset]=c3d(5, 0, 3, offset) |
| 3 | decode1 | d[1+offset]=(d(c[3+offset]-d[5+offset]+c[5+offset]-c[2+offset])/2 |
| 3 | decode2 | d[4+offset]=c3d(3, 5, 1, offset) |
| 3 | decode3 | d[0+offset]=c3d(5, 1, 3, offset) |
| 4 | decode1 | d[2+offset]=c3d(1, 3, 5, offset) |
| 4 | decode2 | d[0+offset]=c3d(5, 1, 3, offset) |
| 4 | decode3 | d[4+offset]=c3d(3, 5, 1, offset) |

FIG. 7

| Volume_Identification_Number | User_Identification_Number |
|---|---|
| 7654 | 1234567 |
| 7654 | 1234568 |
| 7654 | 1234569 |

FIG. 12

| User_Identification_Number | File_Identification_Number |
|---|---|
| 1234567 | 223344 |
| 1234568 | 223357 |
| 1234568 | 223358 |
| 1234569 | 223365 |
| 1234569 | 223367 |
| 1234569 | 223369 |

FIG. 13

| Slice_Identification_Number |
|---|
| 223365-0 |
| 223365-1 |
| 223365-2 |
| 223365-3 |
| 223365-4 |
| 223365-5 |

FIG. 14

| User_Identification_Number | Slice_Identification_Number |
|---|---|
| 1234567 | 223344-3 |
| 1234568 | 223357-3 |
| 1234568 | 223358-4 |
| 1234569 | 223365-3 |
| 1234569 | 223367-0 |
| 1234569 | 223369-3 |

FIG. 15

DataspaceDirectorMap (92)

| iDataspaceID | INTEGER |
|---|---|
| iDirectorAppID | INTEGER |
| iRank | INTEGER |

DataspaceVolumeMap (94)

| iDataspaceID | INTEGER |
|---|---|
| iVolumeID | INTEGER |

TransactionContexts (96)

| iID | INTEGER |
|---|---|
| iDataspaceID | INTEGER |

AccountDataspaceMap (93)

| iAccountID | INTEGER |
|---|---|
| iDataspaceID | INTEGER |

TransactionDatasources (98)

| iTransactionID | INTEGER |
|---|---|
| iDataspaceID | INTEGER |
| iDatasourceID | INTEGER |
| iRevision | INTEGER |
| iParentID | INTEGER |
| sName | VARCHAR |
| iSize | INTEGER |
| iCreationTime | TIMESTAMP |
| tModificationTime | TIMESTAMP |

Datasources (100)

| iDatasourceID | INTEGER |
|---|---|
| iRevision | INTEGER |
| iTransactionContextID | INTEGER |
| iParentID | INTEGER |
| iSize | INTEGER |
| sName | VARCHAR |
| tCreationTime | TIMESTAMP |
| tModificationTime | TIMESTAMP |
| sSecurityContext | VARCHAR |

Applications (102)

| iID | INTEGER |
|---|---|
| iAppTypeID | INTEGER |
| iSiteID | INTEGER |

Dataspaces (106)

| iID | INTEGER |
|---|---|
| iStatus | INTEGER |
| sName | VARCHAR |

Transactions (104)

| iID | INTEGER |
|---|---|
| iTransactionContextID | INTEGER |

FIG. 18

SYSTEM FOR REBUILDING DISPERSED DATA

CROSS REFERENCE TO RELATED APPLICATIONS

This application is a continuation of commonly owned U.S. application Ser. No. 11/403,391, filed on Apr. 13, 2006, now U.S. Pat. No. 7,546,427 which is a continuation-in-part of commonly owned co-pending U.S. application Ser. No. 11/241,555, filed on Sep. 30, 2005.

BACKGROUND OF THE INVENTION

1. Field of the Invention

The present invention relates to a distributed data file storage system and method for storing data using information dispersal algorithms, and more particularly, to a system and method for rebuilding dispersed data. On an information dispersal grid, dispersed data—subsets of an original set of data and/or coded data—are stored on multiple data storage devices in one or more locations such that the dispersed data on each storage device is unrecognizable and unusable except when combined with dispersed data from other digital data storage devices. In order to address the situation when dispersed data is transferred to or stored on an information dispersal grid which is not always fully operational, the present invention provides capabilities to address either temporary or permanent resource outages on an information dispersal grid as well as rebuilding of dispersed data due to resource outages.

2. Description of the Prior Art

Various data storage systems are known for storing data. Normally such data storage systems store all of the data associated with a particular data set, for example, all the data of a particular user or all the data associated with a particular software application or all the data in a particular file, in a single dataspace (i.e. single digital data storage device). Critical data is known to be initially stored on redundant digital data storage devices. Thus, if there is a failure of one digital data storage device, a complete copy of the data is available on the other digital data storage device. Examples of such systems with redundant digital data storage devices are disclosed in U.S. Pat. Nos.: 5,890,156; 6,058,454; and 6,418,539, hereby incorporated by reference. Although such redundant digital data storage systems are relatively reliable, there are other problems with such systems. First, such systems essentially double or further increase the cost of digital data storage. Second, all of the data in such redundant digital data storage systems is in one place making the data vulnerable to unauthorized access.

In order to improve the security and thus the reliability of the data storage system, the data may be stored across more than one storage device, such as a hard drive, or removable media, such as a magnetic tape or a so called "memory stick," as set forth in U.S. Pat. No. 6,128,277, hereby incorporated by reference, as well as for reasons relating to performance improvements or capacity limitations. For example, recent data in a database might be stored on a hard drive while older data that is less often used might be stored on a magnetic tape. Another example is storing data from a single file that would be too large to fit on a single hard drive on two hard drives. In each of these cases, the data subset stored on each data storage device does not contain all of the original data, but does contain a generally continuous portion of the data that can be used to provide some usable information. For example, if the original data to be stored was the string of characters in the following sentence:

The quick brown fox jumped over the lazy dog.

and that data was stored on two different data storage devices, then either one or both of those devices would contain usable information. If, for example, the first 20 characters of that 45 character string was stored on one data storage device and the remaining 25 characters were stored on a second data storage device, then the sentence be stored as follows:

The quick brown fox jumped (Stored on the first storage device) over the lazy dog. (Stored on the second storage device)

In each case, the data stored on each device is not a complete copy of the original data, but each of the data subsets stored on each device provides some usable information.

Typically, the actual bit pattern of data storage on a device, such as a hard drive, is structured with additional values to represent file types, file systems and storage structures, such as hard drive sectors or memory segments. The techniques used to structure data in particular file types using particular file systems and particular storage structures are well known and allow individuals familiar with these techniques to identify the source data from the bit pattern on a physical media.

In order to make sure that stored data is only available to authorized users, data is often stored in an encrypted form using one of several known encryption techniques, such as DES, AES or several others. These encryption techniques store data in some coded form that requires a mathematical key that is ideally known only to authorized users or authorized processes. Although these encryption techniques are difficult to "break", instances of encryption techniques being broken are known making the data on such data storage systems vulnerable to unauthorized access.

In addition to securing data using encryption, several methods for improving the security of data storage using information dispersal algorithms have been developed, for example as disclosed in U.S. Pat. No. 6,826,711 and U.S. Patent Application Publication No. U.S. 2005/0144382, hereby incorporated by reference. Such information dispersal algorithms are used to "slice" the original data into multiple data subsets and distribute these subsets to different storage nodes (i.e. different digital data storage devices). Information dispersal algorithms can also be used to disperse an original data set into multiple data sets, none of which contain any of the original data. Individually, each data subset or slice does not contain enough information to recreate the original data; however, when threshold number of subsets (i.e. less than the original number of subsets) are available, all the original data can be exactly created.

The use of such information dispersal algorithms in data storage systems is also described in various trade publications. For example, "How to Share a Secret", by A. Shamir, *Communications of the ACM*, Vol. 22, No. 11, November, 1979, describes a scheme for sharing a secret, such as a cryptographic key, based on polynomial interpolation. Another trade publication, "Efficient Dispersal of Information for Security, Load Balancing, and Fault Tolerance", by M. Rabin, *Journal of the Association for Computing Machinery*, Vol. 36, No. 2, April 1989, pgs. 335-348, also describes a method for information dispersal using an information dispersal algorithm.

Unfortunately, these methods and other known information dispersal methods are computationally intensive and are thus not applicable for general storage of large amounts of data using the kinds of computers in broad use by businesses, consumers and other organizations today. Thus there is a need for a data storage system that is able to reliably and securely protect data that does not require the use of computation intensive algorithms.

SUMMARY OF THE INVENTION

Briefly, the present invention relates to a digital data file storage system in which original data files to be stored are dispersed using some form of information dispersal algorithm into a number of file "slices" or subsets in such a manner that the data in each file share is less usable or less recognizable or completely unusable or completely unrecognizable by itself except when combined with some or all of the other file shares. These file shares are stored on separate digital data storage devices as a way of increasing privacy and security. As dispersed file shares are being transferred to or stored on a grid of distributed storage locations, various grid resources may become non-operational or may operate below at a less than optimal level. When dispersed file shares are designated to be written to a dispersed storage grid resource which is not available, the grid client designates the dispersed data shares that could not be written at that time on a Rebuild List. In addition when grid resources already storing dispersed data become non-available, a process within the dispersed storage grid designates the dispersed data shares that need to be recreated on a Rebuild List. At other points in time a separate process reads the set of Rebuild Lists and creates the corresponding dispersed data and stores that data on available grid resources.

DESCRIPTION OF THE DRAWINGS

These and other advantages of the present invention will be readily understood with reference to the following drawing and attached specification wherein:

FIG. 5 is an exemplary table in accordance with the present invention that can be used to recreate data which has been stored on the exemplary six digital data storage devices.

FIG. 6 is an exemplary table that lists the decode equations for an exemplary six node data storage system for a condition of two node outages FIG. 7 is similar to FIG. 6 but for a condition with three node outages

FIG. 12 is an exemplary table that lists entries in a Volume Identification Number and User Identification Number mapping table.

FIG. 13 is an exemplary table that lists entries in a User Identification Number and File Identification Number mapping table.

FIG. 14 is an exemplary table that lists entries in a table of Slice Identification Numbers associated with a particular File.

FIG. 15 is an exemplary table that lists entries in User Identification Number and Slice Identification Number mapping table

FIG. 18 shows the essential metadata components that are used during user transactions and during user file set lookup.

DETAILED DESCRIPTION

Figure 1:
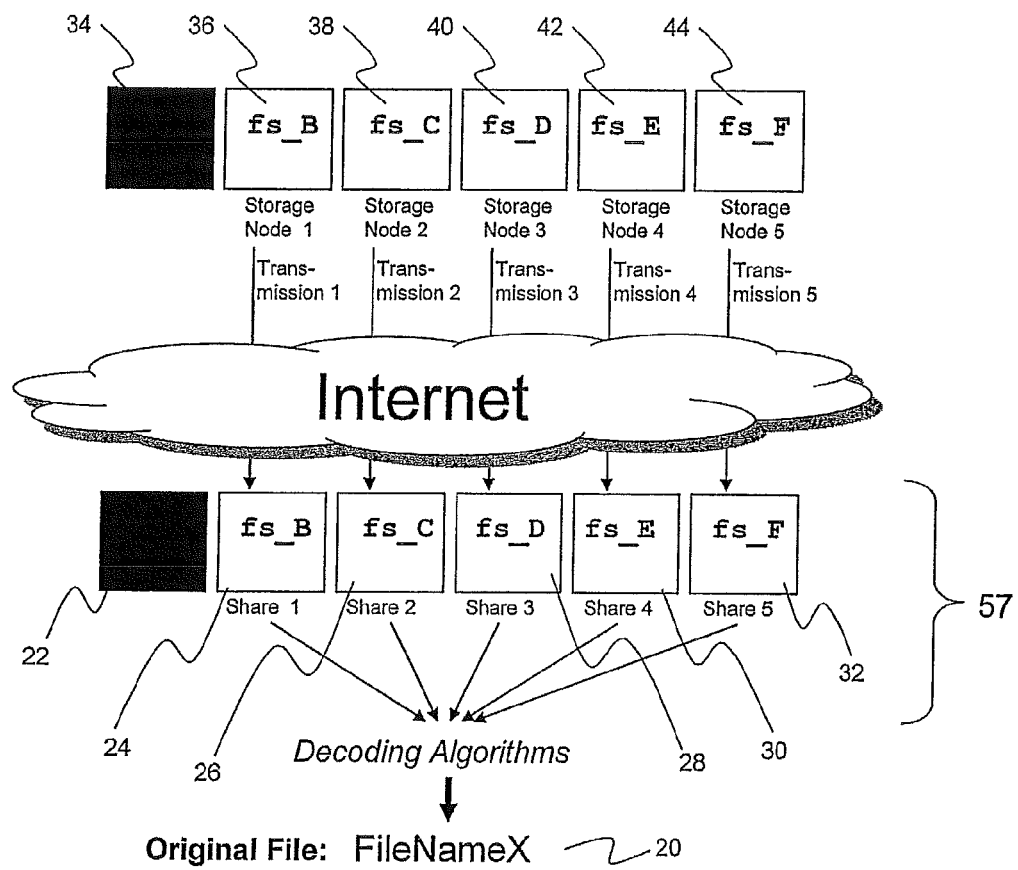
FIG. 1 is a block diagram of an exemplary data storage system with six storage nodes in accordance with the present invention which illustrates how an original data file is dispersed into file shares, coded and transmitted to a separate digital data storage devices or nodes.

The present invention relates to a data storage system. In order to protect the security of the original data, the original data is separated into a number of data "slices" or subsets. This invention can also be used to separate or disperse data files into file slices or file "shares." The amount of data in each slice is less usable or less recognizable or completely unusable or completely unrecognizable by itself except when combined with some or all of the other data subsets. In particular, the system in accordance with the present invention "slices" the original data into data subsets and uses a coding algorithm on the data subsets to create coded data subsets. Each data subset and its corresponding coded subset may be transmitted separately across a communications network and stored in a separate storage node in an array of storage nodes. In order to recreate the original data, data subsets and coded subsets are retrieved from some or all of the storage nodes or communication channels, depending on the availability and performance of each storage node and each communication channel. The original data is recreated by applying a series of decoding algorithms to the retrieved data and coded data.

As with other known data storage systems based upon information dispersal methods, unauthorized access to one or more data subsets only provides reduced or unusable information about the source data. In order to understand the invention, consider a string of N characters $d_0, d_1, \ldots, d_N$ which could comprise a file or a system of files. A typical computer file system may contain gigabytes of data which would mean N would contain trillions of characters. The following example considers a much smaller string where the data string length, N, equals the number of storage nodes, n. To store larger data strings, these methods can be applied repeatedly. These methods can also be applied repeatedly to store computer files or entire file systems.

For this example, assume that the string contains the characters, O L I V E R where the string contains ASCII character codes as follows:

$d_0 = O = 79$
$d_1 = L = 76$
$d_2 = I = 73$
$d_3 = V = 86$
$d_4 = E = 69$
$d_5 = R = 82$

The string is broken into segments that are n characters each, where n is chosen to provide the desired reliability and security characteristics while maintaining the desired level of computational efficiency—typically n would be selected to be below 100. In one embodiment, n may be chosen to be greater than four (4) so that each subset of the data contains less than, for example, ¼ of the original data, thus decreasing the recognizability of each data subset. In an alternate embodiment, n is selected to be six (6), so that the first original data set is separated into six (6) different data subsets as follows:

$A=d_0$, $B=d_1$, $C=d_2$, $D=d_3$, $E=d_4$, $F=d_5$

For example, where the original data is the starting string of ASCII values for the characters of the text O L I V E R, the values in the data subsets would be those listed below:

A=79
B=76
C=73
D=86
E=69
F=82

In this embodiment, the coded data values are created by adding data values from a subset of the other data values in the original data set. For example, the coded values can be created by adding the following data values:

$$c[x]=d[n\_mod(x+1)]+d[n\_mod(x+2)]+d[n\_mod(x+4)]$$

where:

c[x] is the xth coded data value in the segment array of coded data values d[x+1] is the value in the position 1 greater than x in a array of data values d[x+2] is the value in the position 2 greater than x in a array of data values d[x+4] is the value in the position 4 greater than x in a array of data values n_mod( ) is function that performs a modulo operation over the number space 0 to n−1

Using this equation, the following coded values are created:

cA, cB, cC, cD cE, cF where cA, for example, is equal to B+C+E and represents the coded value that will be communicated and/or stored along with the data value, A.

For example, where the original data is the stalling string of ASCII values for the characters of the text O L I V E R, the values in the coded data subsets would be those listed below:

cA=218
cB=241
cC=234
cD=227
cE=234
cF=241

In accordance with the present invention, the original data set 20, consisting of the exemplary data ABCDEF is sliced into, for example, six (6) data subsets A, B, C, D, E and F. The data subsets A, B, C, D, E and F are also coded as discussed below forming coded data subsets cA, cB, cC, cD, cE and cF. The data subsets A, B, C, D, E and F and the coded data subsets cA, cB, cC, cD, cE and cF are formed into a plurality of slices 22, 24, 26, 28, 30 and 32 as shown, for example, in FIG. 1. Each slice 22, 24, 26, 28, 30 and 32, contains a different data value A, B, C, D, E and F and a different coded subset cA, cB, cC, cD, cE and cF. The slices 22, 24, 26, 28, 30 and 32 may be transmitted across a communications network, such as the Internet, in a series of data transmissions and each stored in a different digital data storage device or storage node 34, 36, 38, 40, 42 and 44.

Figure 2:
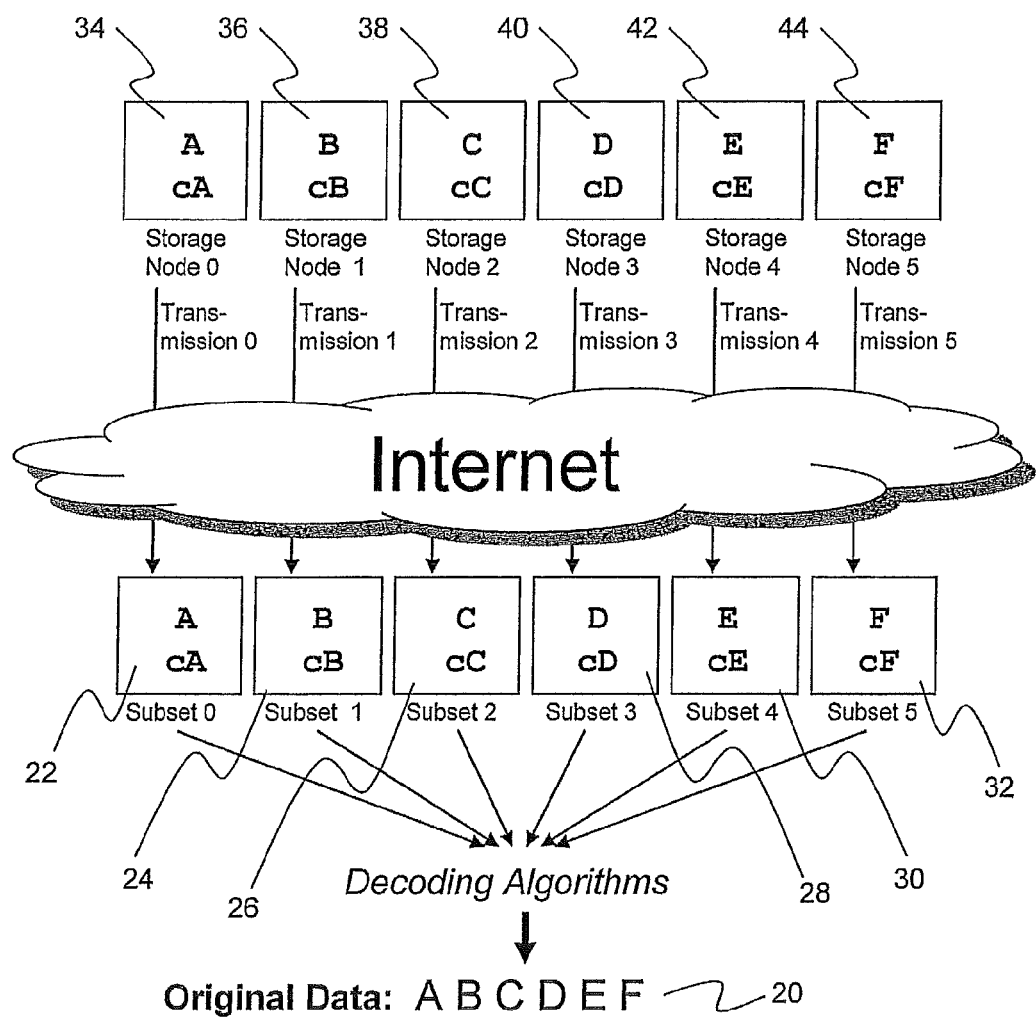
FIG. 2 is similar to FIG. 1 but illustrates how the data subsets from all of the exemplary six nodes are retrieved and decoded to recreate the original data set.

In order to retrieve the original data (or receive it in the case where the data is just transmitted, not stored), the data can be reconstructed as shown in FIG. 2. Data values from each storage node 34, 36, 38, 40, 42 and 44 are transmitted across a communications network, such as the Internet, to a receiving computer (not shown). As shown in FIG. 2, the receiving computer receives the slices 22, 24, 26, 28, 30 and 32, each of which contains a different data value A, B, C, D, E and F and a different coded value cA, cB, cC, cD, cE and cF.

Figure 3:
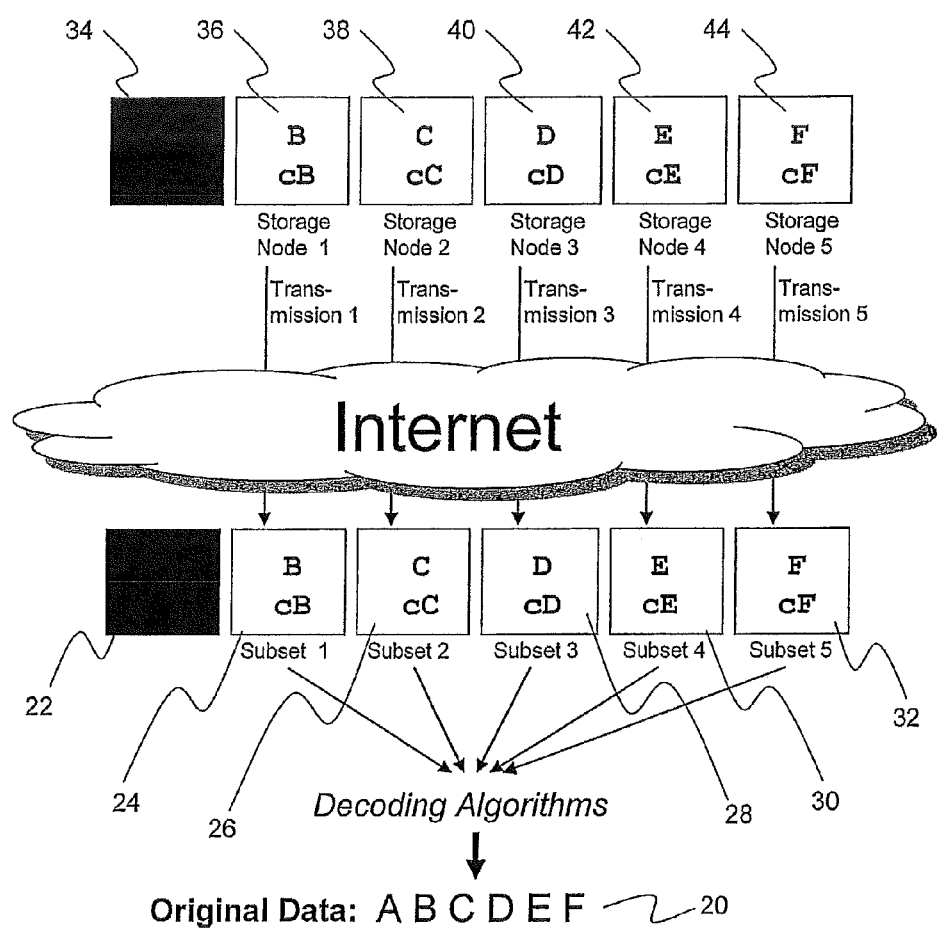
FIG. 3 is similar to FIG. 2 but illustrates a condition of a failure of one of the six digital data storage devices.

For a variety of reasons, such as the outage or slow performance of a storage node 34, 36, 38, 40, 42 and 44 or a communications connection, not all data slices 22, 24, 26, 28, 30 and 32 will always be available each time data is recreated. FIG. 3 illustrates a condition in which the present invention recreates the original data set when one data slice 22, 24, 26, 28, 30 and 32, for example, the data slice 22, containing the data value A and the coded value cA, is not available. In this case, the original data value A can be obtained as follows:

$$A=cC-D-E$$

where cC is a coded value and D and E are original data values, available from the slices 26, 28 and 30, which are assumed to be available from the nodes 38, 40 and 42, respectively. In this case the missing data value can be determined by reversing the coding equation that summed a portion of the data values to create a coded value by subtracting the known data values from a known coded value.

For example, where the original data is the starting string of ASCII values for the characters of the text O L I V E R, the data value of the A could be determined as follows:

$$A=234-86-69$$

Therefore A=79 which is the ASCII value for the character, O.

Figure 4:
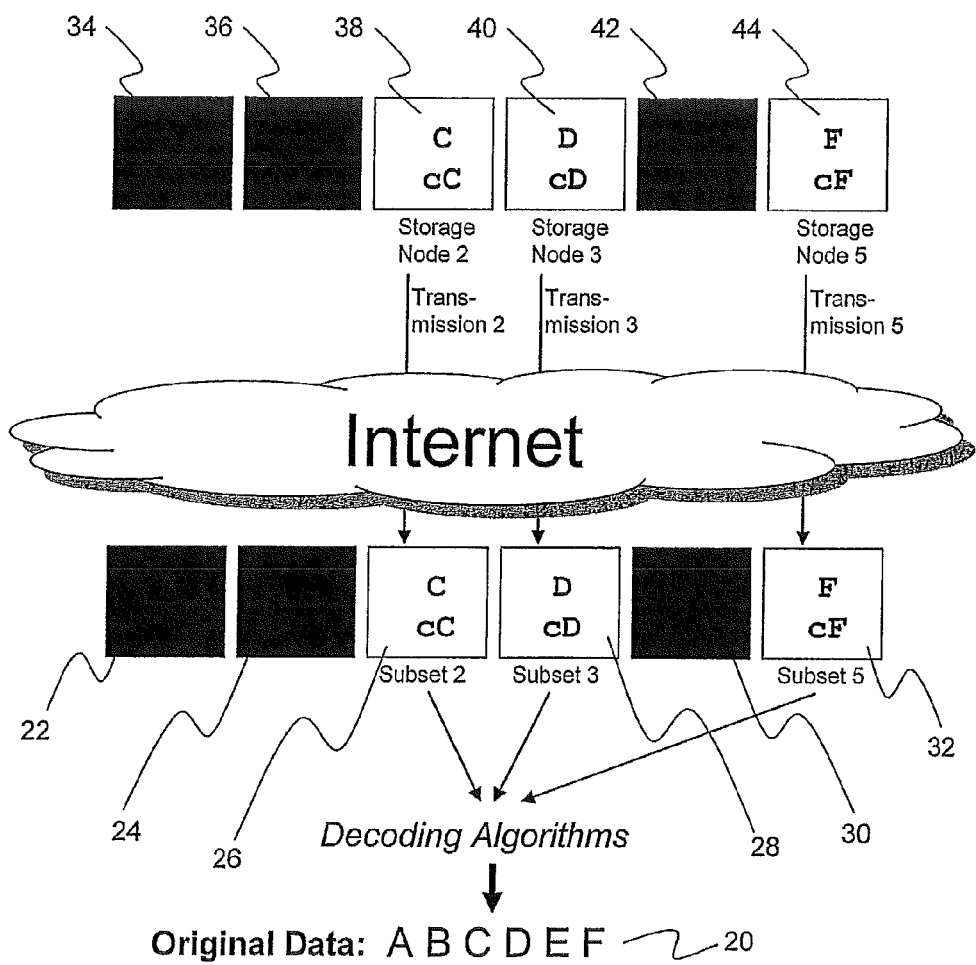
FIG. 4 is similar FIG. 3 but for the condition of a failure of three of the six digital data storage devices.

In other cases, determining the original data values requires a more detailed decoding equation. For example, FIG. 4 illustrates a condition in which three (3) of the six (6) nodes 34, 36 and 42 which contain the original data values A, B and E and their corresponding coded values cA, cB and cE are not available. These missing data values A, B and E and corresponding in FIG. 4 can be restored by using the following sequence of equations:

$$B=(cD-F+cF-cC)/2 \qquad 1$$

$$E=cD-F-B \qquad 2$$

$$A=cF-B-D \qquad 3$$

These equations are performed in the order listed in order for the data values required for each equation to be available when the specific equation is performed.

For example, where the original data is the starting string of ASCII values for the characters of the text O L I V E R, the data values of the B, E and A could be determined as follows:

$$B=(227-82+241-234)/2 \qquad 1$$

B=76

$$E=227-82-76 \qquad 2$$

E=69

$$A=241-76-86 \qquad 3$$

A=79

In order to generalize the method for the recreation of all original data ABCDEF when n=6 and up to three slices 22, 24, 26, 28 30 and 32 are not available at the time of the recreation, FIG. 5 contains a table that can be used to determine how to recreate the missing data.

This table lists the 40 different outage scenarios where 1, 2, or 3 out of six storage nodes are not available or performing slow enough as to be considered not available. In the table in FIG. 5, an 'X' in a row designates that data and coded values from that node are not available. The 'Type' column designates the spatial pattern type of nodes not available. An 'Offset' value for each outage scenario is also indicated. The offset is the difference between the spatial position of a particular outage scenario and the first outage scenario of that Type.

The data values can be represented by the array d[x], where x is the node number where that data value is stored. The coded values can be represented by the array c[x].

In order to reconstruct missing data in an outage scenario where one node is not available in a storage array where n=6, the follow equation can be used:

$$d[0+\text{offset}]=c3d(2, 3, 4, \text{offset})$$

where c3d( ) is a function in pseudo computer software code as follows:

```
c3d(coded_data_pos, known_data_a_pos, known_data_b_pos,
    offset)
{
    unknown_data=
        c[n_mod(coded_data_pos+offset)]-
        d[n_mod(known_data_a_pos+offset)]-
        d[n_mod(known_data_b_pos+offset)];
    return unknown_data
}
``` where n_mod( ) is the function defined previously.

In order to reconstruct missing data in an outage scenario where two nodes are not available in a storage array where n=6, the equations in the table in FIG. 6 can be used. In FIG. 6, the 'Outage Type Num' refers to the corresponding outage 'Type' from FIG. 5. The 'Decode Operation' in FIG. 6 refers to the order in which the decode operations are performed. The 'Decoded Data' column in FIG. 6 provides the specific decode operations which produces each missing data value.

In order to reconstruct missing data in an outage scenario where three nodes are not available in a storage array where n=6, the equations in the table in FIG. 7 can be used. Note that in FIG. 7, the structure of the decode equation for the first decode for outage type=3 is a different structure than the other decode equations where n=6.

Figure 8:
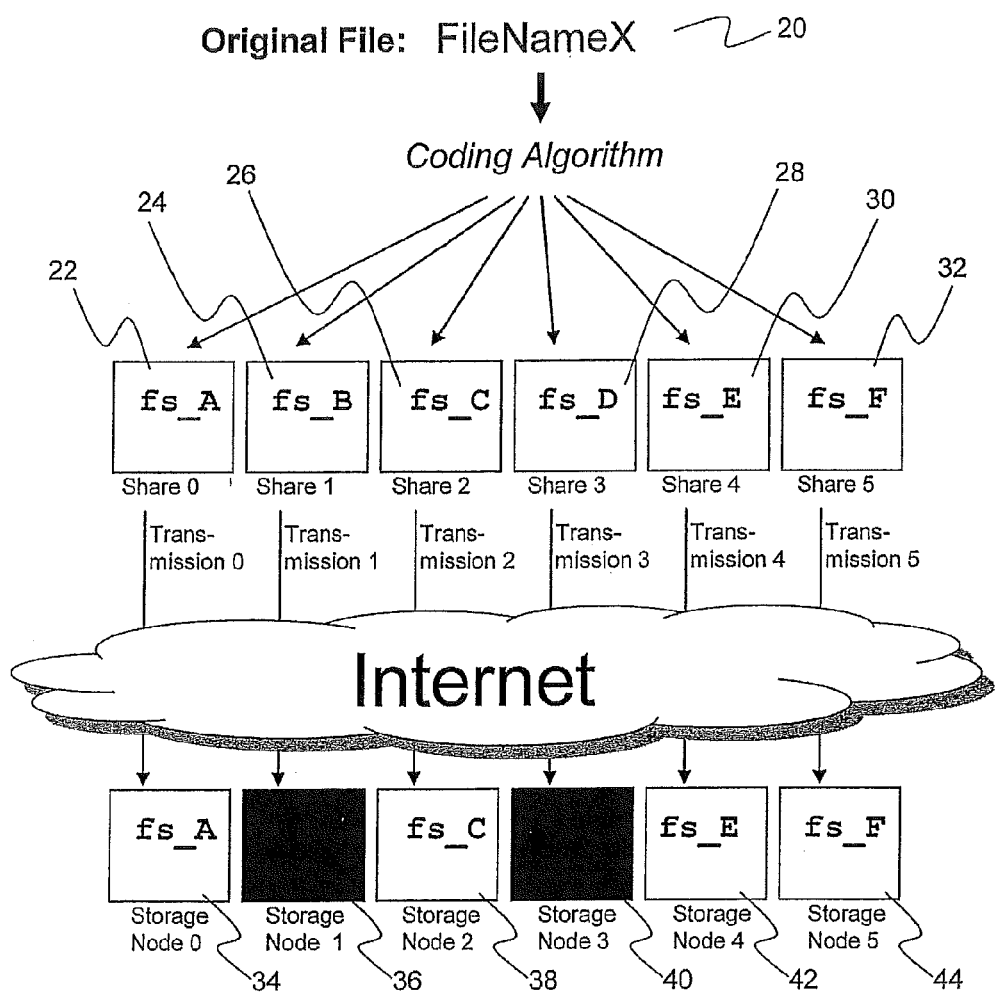
FIG. 8 is similar to FIG. 2 but illustrates a condition of a failure of one of the six digital data storage devices while data is being written to a storage grid.

In addition to situations where not all storage nodes 57 are available when reading data from the grid, all storage nodes 57 may not be available when writing to the dispersed storage grid 49, as shown in FIG. 8. In the example shown in FIG. 8, it is assumed that the storage nodes 1 and 3, identified with the reference numerals 36 and 40, respectively, are not available when a grid client 64 is writing to the grid. In such a situation, a grid client 64 may choose to use other storage nodes 57 to store the data in storage nodes 1 and 3 or the client 64 may write to a Rebuilder List 66 or a set of duplicate Rebuilder Lists, stored on other nodes on the storage grid, as shown in step 1 in FIG. 9. In general, the Rebuilder Lists 66 list the missing data slices so that the missing data slices can be recreated in the manner discussed above. In this example, where storage nodes 1 and 3 are not operating, the grid client 64 does not store the slices designated for nodes 1 and 3 directly on other storage nodes 57 on the grid, but instead, the grid client 64 adds the data slices to the Rebuilder Lists 66, as shown in FIG. 10.

When the non-operational storage nodes 1 and 3 become operational again at a later time, then a process on the storage grid, called a Rebuilt Agent 67, can be used to rebuild the missing data slices as shown in steps 2, 3 and 4 in FIG. 9. Using the example above, the Rebuild Agent 67 first reads the information in FIG. 10 in step 2. Then the Rebuild Agent 67 recreates the data slices by first creating the data values in the missing slices and then creating the coded values in each of the missing slices.

To create the missing data values in this example, the Rebuilt Agent 67 uses the table in FIG. 5 to determine that the outage type for a six node grid with nodes 1 and 3 missing is an outage Type 2 with and offset of 1. In this example, the Rebuilt Agent 67 uses the equations for a Type 2 outage on a six node grid from FIG. 6 which are:

| Outage Type Num | Decode Operation | Decoded data |
| --- | --- | --- |
| 2 | decode1 | d[0 + offset] = c3d(5, 1, 3, offset) |
| 2 | decode2 | d[2 + offset] = c3d(1, 3, 5, offset) |

Using the example data with the ASCII values for the original data for the word OLIVER, then the missing first data value would be determined by the following equations:

$$d_1 = c_0 - d_2 - d_4 \quad \text{(first decode equation)}$$

As shown in step 3 in FIG. 8, the Rebuilt Agent retrieves the required data slices from storage nodes 57 on the grid, then recreates the first missing slice data as shown below:

$$B = cA - C - E$$

$$B = 218 - 73 - 69$$

$$B = 76$$

The ASCII value of 76 corresponds to the character 'L' which is the original data for Storage Note 1. The second missing original data value can be determined as follows:

$$d_3 = c_2 - d_4 - d_0 \quad \text{(second decode equation)}$$

As shown in step 3, in FIG. 8, the Rebuilt Agent retrieves the required data slices from storage nodes 57 on the grid, then recreates the second missing slice data as shown below:

$$D = cC - E - A$$

$$D = 234 - 69 - 79$$

$$D = 86$$

The ASCII value of 86 corresponds to the character 'V' which is the original data for storage node 3.

Recreating the coded data values for storage nodes 1 and 3 can be done by reapplying the original coding equation:

$$c[x] = d[n\_mod(x+1)] + d[n\_mod(x+2)] + d[n\_mod(x+4)]$$

Recreating the example coded data values then proceeds as follows:

$$cB = C + D + F$$

$$cB = 73 + 86 + 82$$

$cB = 241$ $cD = E + F + B$ $cD = 69 + 82 + 76$ $cD = 227$

Figure 9:
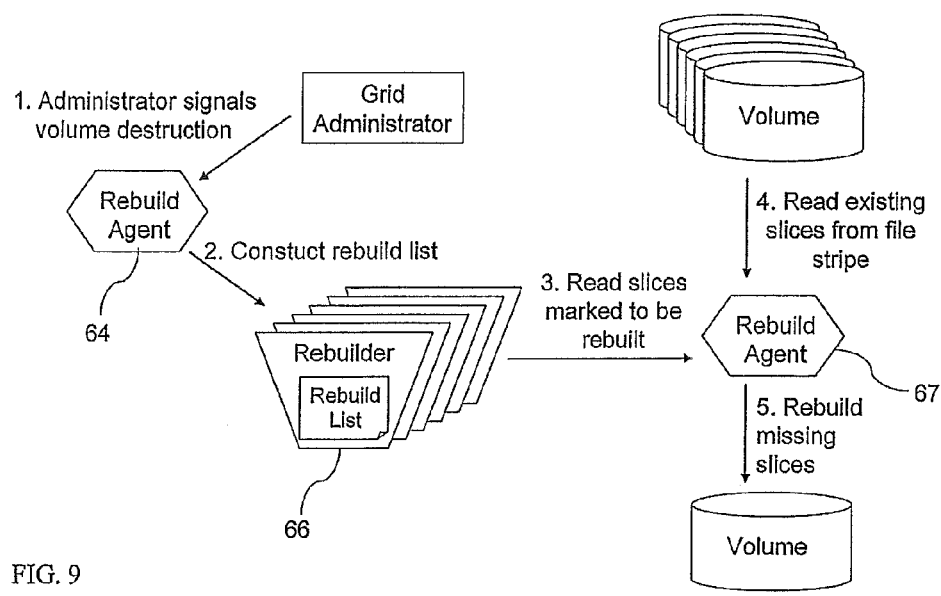
FIG. 9 is a block diagram of an exemplary data rebuilder system that rebuilds data when a storage resource is not available while new data is being written to a storage grid.
Figure 10:
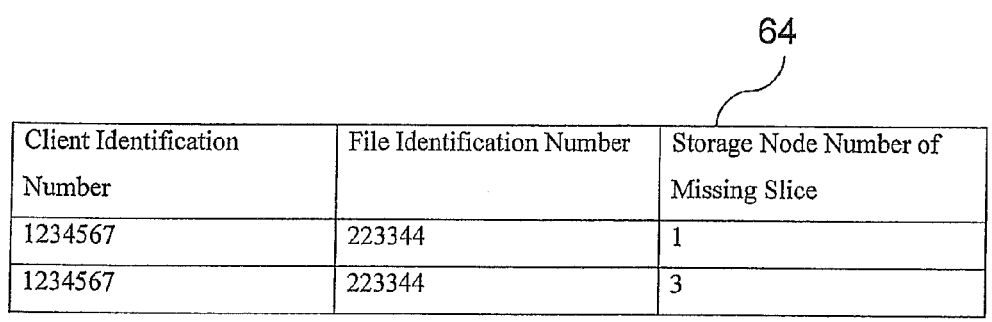
FIG. 10 is an exemplary table that lists entries in a Rebuild List table.

The data slice made up of B and cB can then be written to storage node 1 and the data slice made up of D and cD can then be written to storage node 3 as shown in step 4 in FIG. 9. This method of rebuilding slices can be used to rebuild dispersed data when storage resources are temporarily unavailable as grid clients are writing new data onto the grid.

Figure 11:
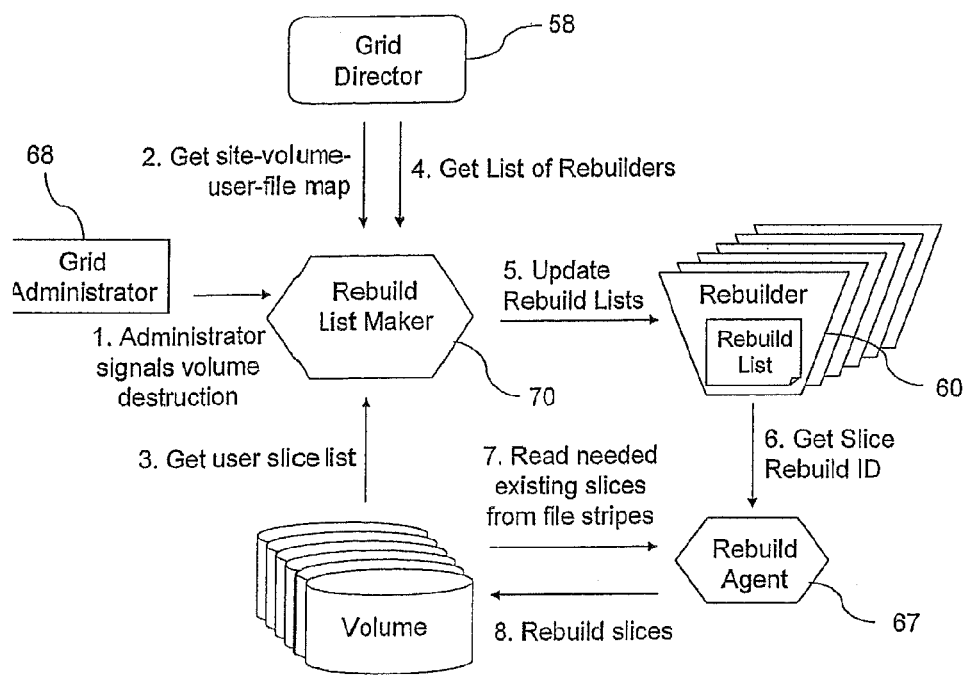
FIG. 11 is a block diagram of an exemplary data rebuilder system that rebuilds data when a storage resource is replaced.

FIG. 11 shows how slices can be rebuilt when storage resources are permanently damaged and are replaced by new resources. In this scenario, the data slices previously held by the permanently lost storage resources are recreated on the new, replacement storage resources. In step 1, a Grid Administrator 68, which may be an automated process or a person making a judgment, determines that a storage resource as represented by a storage node 57 in FIG. 11 is permanently unavailable. The Grid Administrator 68 then designates a replacement dataspace in a storage node 57 with the following exemplary information: Volume_Identification_Number, Volume_Location. In this example, the Volume_Identification_Number is the dataspace number on which the data slice was previously stored and now unavailable. The Volume_Location is the network location of the new storage node 57. In this example, the Volume_Identification_Number could be represented by the number 7654 and the network location could be represented by an Internet IP address in the form 123.123.123.123. The Grid Administrator 68 provides this information to a process running on the dispersed storage grid called a Rebuild List Maker 70.

As shown in step 2 in FIG. 11, the Rebuilt List Maker 70 then gets Volume, User and File information from a process on the dispersed storage grid called a Grid Director 58, discussed below. Volumes are data storage processes on the grid which can be comprised of hard drives, servers or groups of servers in multiple locations. Users are a designation for specific grid clients 64. In this example, Files are identifies of original data files which have been dispersed across the grid. As discussed in more detail below, grid directors 58 are processes that keep track of Volume, User and File information on the grid. The Rebuild List Maker 70 requests the grid director 58 to provide information about Users associated with the to-be-rebuilt Volume 7654 and the grid director 58 returns as shown in FIG. 12.

FIG. 12 shows that three users have data on the to-be-rebuilt volume 7654. These users have the identification numbers: 1234567, 1234568 and 1234569. The Rebuild List Maker 70 also requests from the grid director 58, a table that relates Files to the 3 affected Users. The grid director 58 returns a table like the one shown in FIG. 13. FIG. 13 shows that six files were associated with the users storing data on the to-be-rebuilt volume.

The Rebuilt List Maker 70 then creates a list of the total slices that would be associated with these files affected by the loss of the to-be-rebuilt dataspace or Volume. The File_Identification_Number can be converted to a corresponding Slice_Identification_Number by adding a dash and a number corresponding to the set of slices created from that File, In this example for each file on a six node dispersed storage grid, a list like that shown in FIG. 14 of Slice_Identification_Numbers would be created to show all the slices for that file that could be affected by the loss of the to-be-rebuilt Volume.

The first six digits of the Slice_Identification_Number shown in FIG. 14 corresponds to the File_Identification_Number used to create that slice. The last digit of the Slice_Identification_Number corresponds to the specific slice identified within that stripe or set of file slices.

Next, as shown in step 3 in FIG. 11, the Rebuild List Maker 70 queries all the storage nodes 57 on the grid associated with the Users associated with the to-be-rebuilt Volume to create a list of all Slices currently stored on the grid associated with those Users.

As shown in step 3 in FIG. 11, the Rebuild List Maker 70 next queries each storage node 57 on the grid to determine all slices stored on the grid which are associated with the Users affected by the to-be-rebuilt Volume. Each storage node 57 returns to the Rebuild List Maker a table in the form as shown in FIG. 15.

The Rebuild List Maker 70 collects all the Slice_Identification_Numbers currently stored on the grid associated with the User affected by the to-be-rebuild Volume. Then for each Slice as shown in FIG. 14 associated with each File affected by the to-be-rebuilt Volume as shown in FIG. 13, the Rebuild List Maker 70 determines if that Slice is currently stored on the grid by determining if that Slice_Identification_Number appears in one of the tables of Slices currently stored on the grid as shown in FIG. 15.

For each slice that is not currently stored on the grid, the Rebuild List Maker 70 adds an entry to a Rebuilder List 66 or set of Rebuilder Lists, as shown in step 5 in FIG. 11. The processes for then completing steps 5, 6, 7 and 8 in FIG. 11 are then performed in the same manner as the processes for the previously described steps 1, 2, 3, and 4 in FIG. 9.

These types of data rebuilding methods can be used by those practiced in the art of software development to create reliable storage grids with varying numbers of storage nodes with varying numbers of storage node outages that can be tolerated by the storage grid while perfectly restoring all original data.

Metadata Management System for Information Dispersal Storage System

In accordance with an important aspect of the invention, a metadata management system is used to manage dispersal and storage of information that is dispersed and stored in several storage nodes coupled to a common communication network forming a grid, for example, as discussed above in connection with FIGS. 1-8. In order to enhance the reliability of the information dispersal system, metadata attributes of the transactions on the grid are stored in separate dataspace from the dispersed data.

As discussed above, the information dispersal system "slices" the original data into data subsets and uses a coding algorithm on the data subsets to create coded data subsets. In order to recreate the original data, data subsets and coded subsets are retrieved from some or all of the storage nodes or communication channels, depending on the availability and performance of each storage node and each communication channel, As with other known data storage systems based upon information dispersal methods, unauthorized access to one or more data subsets only provides reduced or unusable information about the source data. For example as illustrated in FIG. 1, each slice 22, 24, 26, 28, 30 and 32, contains a different data value A, B, C, D, E and F and a different "coded subset" (Coded subsets are generated by algorithms and are stored with the data slices to allow for restoration when restoration is done using part of the original subsets) cA, cB, cC, cD, cE and cF. The slices 22, 24, 26, 28, 30 and 32 may be transmitted across a communications network, such as the Internet, in a series of data transmissions to a series and each stored in a different digital data storage device or storage node 34, 36, 38, 40, 42 and 44. Each data subset and its corresponding coded subset may be transmitted separately across a communications network and stored in a separate storage node in an array of storage nodes.

A "file stripe" is the set of data and/or coded subsets corresponding to a particular file. Each file stripe may be stored on a different set of data storage devices or storage nodes 57 within the overall grid as available storage resources or storage nodes may change over time as different files are stored on the grid.

A "dataspace" is a portion of a storage grid 49 that contains the data of a specific client 64. A grid client may also utilize more than one data. The dataspaces table 106 in FIG. 11 shows all dataspaces associated with a particular client. Typically, particular grid clients are not able to view the dataspaces of other grid clients in order to provide data security and privacy.

Figure 16:
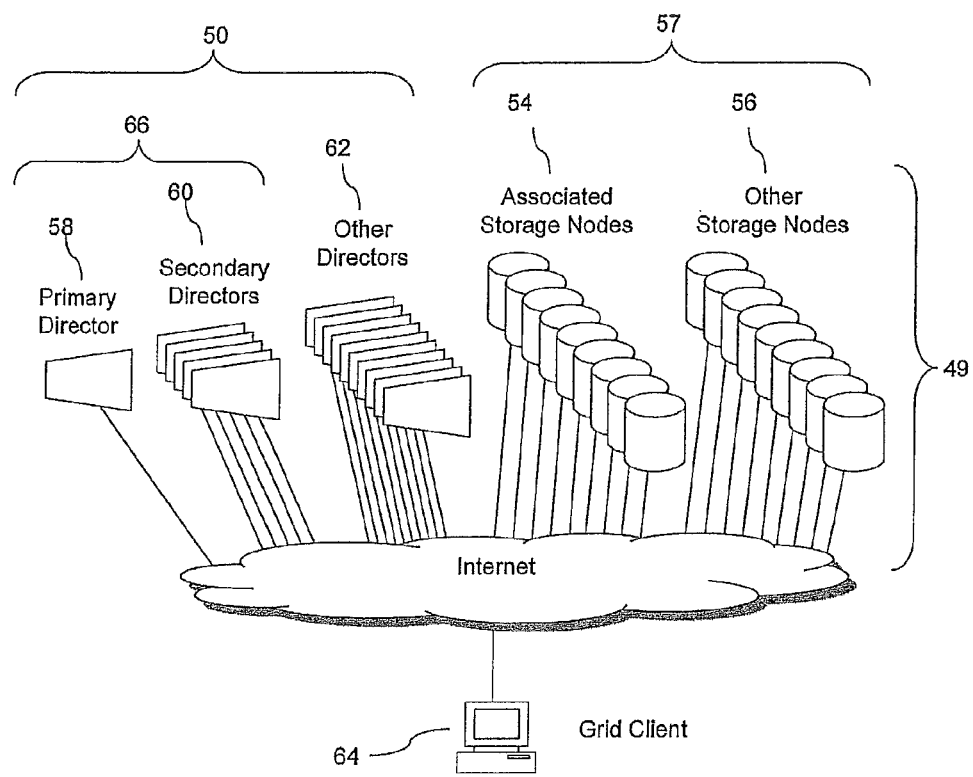
FIG. 16 is an exemplary diagram in accordance with the present invention which illustrates the various functional elements of a metadata management system for use with an information dispersal storage system in accordance with the present invention.

FIG. 16 shows the different components of a storage grid, generally identified with the reference numeral 49. The grid 49 includes associated storage nodes 54 associated with a specific grid client 64 as well as other storage nodes 56 associated with other grid clients (collectively or individually "the storage nodes 57"), connected to a communication network, such as the Internet. The grid 49 also includes applications for managing client backups and restorations in terms of dataspaces and their associated collections.

In general, a "director" is an application running on the grid 49. The director serves various purposes, such as:

1. Provide a centralized-but-duplicatable point of User-Client login. The Director is the only grid application that stores User-login information.
2. Autonomously provide a per-User list of stored files. All User-Client's can acquire the entire list of files stored on the Grid for each user by talking to one and only one director. This file-list metadata is duplicated across one Primary Directory to several Backup Directors.
3. Track which Sites contain User Slices.
4. Manager Authentication Certificates for other Node personalities.

The applications on the grid form a metadata management system and include a primary director 58, secondary directors 60 and other directors 62. Each dataspace is always associated at any given time with one and only one primary director 58. Every time a grid client 64 attempts any dataspace operation (save/retrieve), the grid client 64 must reconcile the operation with the primary director 58 associated with that dataspace. Among other things, the primary director 58 manages exclusive locks for each dataspace. Every primary director 58 has at least one or more secondary directors 60. In order to enhance reliability of the system, any dataspace metadata updates (especially lock updates) are synchronously copied by the dataspace's primary director 58 and to all of its secondary or backup directors 60 before returning acknowledgement status back to the requesting grid client 64. In addition, for additional reliability, all other directors 62 on the Grid may also asynchronously receive a copy of the metadata update. In such a configuration, all dataspace metadata is effectively copied across the entire grid 49.

As used herein, a primary director 58 and its associated secondary directors 60 are also referred to as associated directors 60. The secondary directors 60 ensure that any acknowledged metadata management updates are not lost in the event that a primary director 58 fails in the midst of a grid client 64 dataspace update operation. There exists a trade-off between the number of secondary directors 60 and the metadata access performance of the grid 49. In general, the greater the number of secondary directors 60, the higher the reliability of metadata updates, but the slower the metadata update response time.

The associated directors 66 and other directors 62 do not track which slices are stored on each storage node 57, but rather keeps track of the associated storage nodes 57 associated with each grid client 64. Once the specific nodes are known for each client, it is necessary to contact the various storage nodes 57 in order to determine the slices associated with each grid client 64.

While the primary director 58 controls the majority of Grid metadata; the storage nodes 57 serve the following responsibilities:

1. Store the user's slices. The storage nodes 57 store the user slices in a file-system that mirrors the user's file-system structure on the Client machine(s).
2. Store a list of per-user files on the storage node 57 in a database. The storage node 57 associates minimal metadata attributes, such as Slice hash signatures (e.g., MD5s) with each slice "row" in the database.

The Grid identifies each storage node 57 with a unique storage volume serial number (volumeID) and as such can identify the storage volume even when it is spread across multiple servers. In order to recreate the original data, data subsets and coded subsets are retrieved from some or all of the storage nodes 57 or communication channels, depending on the availability and performance of each storage node 57 and each communication channel Each primary director 58 keeps a list of all storage nodes 57 on the grid 49 and therefore all the nodes available at each site.

Following is the list of key metadata attributes used during backup/restore processes:

| Attribute | Description |
| --- | --- |
| iAccountID | Unique ID number for each account, unique for each user. |
| iDataspaceID | Unique ID for each user on all the volumes, it is used to keep track of the user data on each volume. |
| iDirectorAppID | Grid wide unique ID which identifies a running instance of the director. |
| iRank | Used to insure that primary director always has accurate metadata. |
| iVolumeID | Unique for identifying each volume on the Grid, director uses this to generate a volume map for a new user (first time) and track volume map for existing users. |
| iTransactionContextID | Identifies a running instance of a client. |
| iApplicationID | Grid wide unique ID which identifies running instance of an application. |
| iDatasourceID | All the contents stored on the grid is in the form of data source, each unique file on the disk is associated with this unique ID. |
| iRevision | Keeps track of the different revisions for a data source. |
| iSize | Metadata to track the size of the data source. |
| sName | Metadata to track the name of the data source. |
| iCreationTime | Metadata to track the creation time of the data source. |
| iModificationTime | Metadata to track the last modification time of the data source. |

Figure 17:
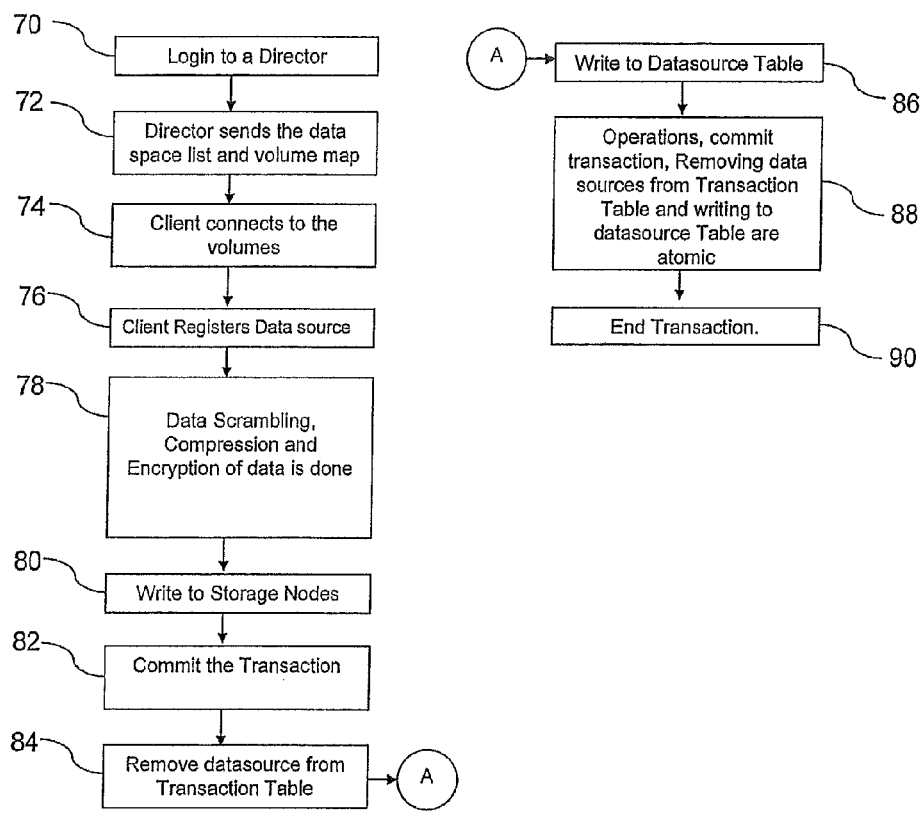
FIG. 17 is an exemplary flow chair that shows the process for maintaining metadata for data stored on the dispersed data storage grid.

FIG. 17 describes a flow of data and a top level view of what happens when a client interacts with the storage system. FIG. 18 illustrates the key metadata tables that are used to keep track of user info in the process.

Referring to FIG. 17, initially in step 70, a grid client 64 starts with logging in to a director application running on a server on the grid. After a successful log in, the director application returns to the grid client 64 in step 72, a DataspaceDirectorMap 92 (FIG. 18). The director application includes an AccountDataspaceMap 93; a look up table which looks up the grid client's AccountID in order to determine the DataspaceID. The DataspaceID is then used to determine the grid client's primary director (i.e. DirectorAppID) from the DataspaceDirectorMap 92.

Once the grid client 64 knows its primary director 58, the grid client 64 can request a Dataspace VolumeMap 94 (FIG. 18) and use the DataspaceID to determine the storage nodes associated with that grid client 64 (i.e.VolumeID). The primary director 58 sets up a TransactionContextID for the grid client 64 in a Transactions table 104 (FIG. 18). The TransactionContextID is unique for each transaction (i.e. for each running instance or session of the grid client 64). In particular, the Dataspace ID from the DataspaceDirectorMap 92 is used to create a unique transaction ID in a TransactionContexts table 96. The transaction ID stored in a Transaction table 104 along with the TransactionContextID in order to keep track of all transactions by all of the grid clients for each session of a grid client with the grid 49.

The "TransactionContextId" metadata attribute is a different attribute than TransactionID in that a client can be involved with more than one active transactions (not committed) but at all times only one "TransactionContextId" is associated with one running instance of the client. These metadata attributes allow management of concurrent transactions by different grid clients.

As mentioned above, the primary director 58 maintains a list of the storage nodes 57 associated with each grid client 64. This list is maintained as a TransactionContexts table 96 which maintains the identities of the storage nodes (i.e. DataspaceID) and the identity of the grid client 64 (i.e. ID). The primary director 58 contains the "Application" metadata (i.e. Applications table 104) used by the grid client 64 to communicate with the primary director 58. The Applications table 64 is used to record the type of transaction (AppTypeID), for example add or remove data slices and the storage nodes 57 associated with the transaction (i.e. SiteID).

Before any data transfers begins, the grid client 64 files metadata with the primary director 58 regarding the intended transaction, such as the name and size of the file as well as its creation date and modification date, for example. The metadata may also include other metadata attributes, such as the various fields illustrated in the TransactionsDatasources table 98. (FIG. 18) The Transaction Datasources metadata table 98 is used to keep control over the transactions until the transactions are completed.

After the above information is exchanged between the grid client 64 and the primary director 58, the grid client 64 connects to the storage nodes in step 74 in preparation for transfer of the file slices. Before any information is exchanged, the grid client 64 registers the metadata in its Datasources table 100 in step 76 in order to fill in the data fields in the Transaction Datasources table 98.

Next in step 78, the data slices and coded subsets are created in the manner discussed above by an application running on the grid client 64. Any data scrambling, compression and/or encryption of the data may be done before or after the data has been dispersed into slices. The data slices are then uploaded to the storage nodes 57 in step 80.

Once the upload starts, the grid client 64 uses the transaction metadata (i.e. data from Transaction Datasources table 98) to update the file metadata (i.e. DataSources table 100).

Once the upload is complete, only then the datasource information from the Transaction Datasources table 98 is moved to the Datasource table 100 and removed from the Transaction Datasources table 98 in steps 84, 86 and 88. This process is "atomic" in nature, that is, no change is recorded if at any instance the transaction fails. The Datasources table 100 includes revision numbers to maintain the integrity of the user's file set.

Figure 19A:
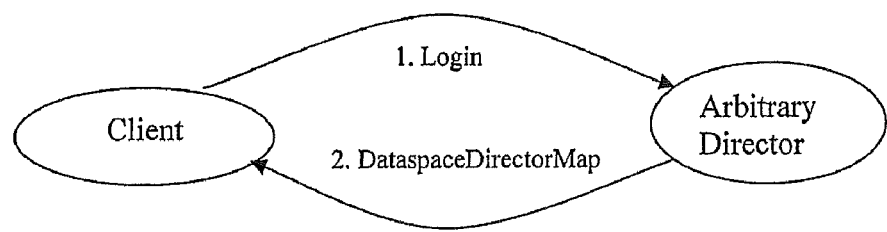
FIGS. 19A and 19B illustrate the operation of the system.
Figure 19B:
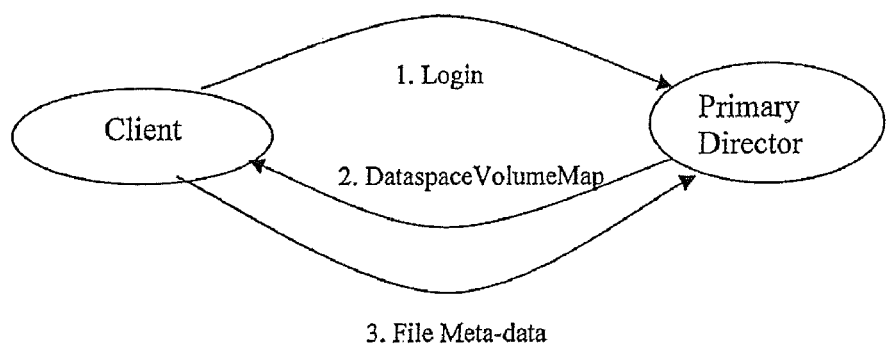

A simple example, as illustrated in FIGS. 19A and 19B, illustrates the operation of the metadata management system 50. The example assumes that the client wants to save a file named "Myfile.txt" on the grid 49.

Step 1: The grid client connects to the director application running on the grid 49. Since the director application is not the primary director 58 for this grid client 64, the director application authenticates the grid client and returns the DataspaceDirectorMap 92. Basically, the director uses the AccountID to find its DataspaceID and return the corresponding DirectorAppID (primary director ID for this client).

Step 2: Once the grid client 64 has the DataspaceDirectorMap 92, it now knows which director is its primary director. The grid client 64 then connects to this director application and the primary director creates a TransactionContextID, as explained above, which is unique for the grid client session. The primary director 58 also sends the grid client 64 its DataspaceVolumeMap 94 (i.e. the number of storage nodes 57 in which the grid client 64 needs to a connection). The grid client 64 sends the file metadata to the director (i.e. fields required in the Transaction Datasources table).

Step 3: By way of an application running on the client, the data slices and coded subsets of "Myfile.txt" are created using storage algorithms as discussed above. The grid client 64 now connects to the various storage nodes 57 on the grid 49, as per the DataspaceVolumeMap 94. The grid client now pushes its data and coded subsets to the various storage nodes 57 on the grid 49.

Step 4: When the grid client 64 is finished saving its file slices on the various storage nodes 57, the grid client 64 notifies the primary director application 58 to remove this transaction from the TransactionDatasources Table 98 and add it to the Datasources Table 100. The system is configured so that the grid dent 64 is not able retrieve any file that is not on the Datasources Table 100. As such, adding the file Metadata on the Datasources table 100 completes the file save/backup operation.

As should be clear from the above, the primary director 58 is an application that decides when a transaction begins or ends. A transaction begins before a primary director 58 sends the storage node 57 metadata to the grid client 64 and it ends after writing the information about the data sources on the Datasources table 100. This configuration insures completeness. As such, if a primary director 58 reports a transaction as having completed, then any application viewing that transaction will know that all the other storage nodes have been appropriately updated for the transaction. This concept of "Atomic Transactions" is important to maintain the integrity of the storage system. For example, if the entire update transaction does not complete, and all of the disparate storage nodes are not appropriately "synchronized," then the storage system is left in a state of disarray, at least for the Dataspace table 100 of the grid client 64 in question. Otherwise, if transactions are interrupted for any reason (e.g., simply by powering off a client PC in the middle of a backup process) and are otherwise left in an incomplete state, the system's overall data integrity would become compromised rather quickly.

Obviously, many modifications and variations of the present invention are possible in light of the above teachings. Thus, it is to be understood that, within the scope of the appended claims, the invention may be practiced otherwise than is specifically described above.

What is claimed and desired to be secured by a Letters Patent of the United States is:

1. A method operating on a distributed computer system, the method comprising the steps of:
   creating a plurality of data slices from a data file;
   determining a plurality of storage nodes for storing the plurality of data slices;
   determining that less than a threshold number of the plurality of storage nodes are unavailable to produce at least one unavailable storage node and a set of available storage nodes of the plurality of storage nodes;
   outputting a set of the plurality of data slices to the set of available storage nodes for storage therein; and
   adding at least one of the plurality of data slices to a rebuild list, wherein the at lest one of the plurality of data slices is targeted for storage in the at least one unavailable storage node.

2. The method of claim 1, wherein the number of data slices created from said data file and the threshold number corresponds to the desired level of reliability and security.

3. The method of claim 1, wherein the step of outputting said data slices includes storing metadata associated with said data file.

4. The method of claim 1 further comprises:
   determining that the at least one unavailable storage node has become available to produce at least one currently available storage node;
   when the at least one unavailable storage node has become available, rebuilding the at least one data slice identified in the rebuild list to produce a rebuilt data slice; and
   outputting the rebuilt data slice for storing in the at least one currently available storage node.

5. The method of claim 1, further comprises mapping the storage location of each of the plurality of data slices to corresponding ones of the plurality of storage nodes.

6. A computer comprises:
   an interface; and
   a central processing unit operable to:
      create a plurality of data slices from a data file;
      determine a plurality of storage nodes for storing the plurality of data slices;
      determine that less than a threshold number of the plurality of storage nodes are unavailable to produce at least one unavailable storage node and a set of available storage nodes of the plurality of storage nodes;
      output, via the interface, a set of the plurality of data slices to the set of available storage nodes for storage therein; and
      facilitate adding at least one of the plurality of data slices to a rebuild list, wherein the at lest one of the plurality of data slices is targeted for storage in the at least one unavailable storage node.

7. The computer of claim 6, wherein the number of data slices created from said data file and the threshold number corresponds to the desired level of reliability and security.

8. The computer of claim 6, wherein the central processing unit is further operable to output, via the interface, metadata of the data file with the plurality of data slices.

9. The computer of claim 6, wherein the central processing unit is further operable to:
   determine that the at least one unavailable storage node has become available to produce at least one currently available storage node;
   when the at least one unavailable storage node has become available, initiate rebuilding the at least one data slice identified in the rebuild list to produce a rebuilt data slice; and
   facilitate outputting the rebuilt data slice for storing in the at least one currently available storage node.

10. The computer of claim 6, wherein the central processing unit is further operable to map storage location of each of the plurality of data slices to corresponding ones of the plurality of storage nodes.

* * * * *

UNITED STATES PATENT AND TRADEMARK OFFICE
CERTIFICATE OF CORRECTION

PATENT NO.         : 7,818,518 B2                                     Page 1 of 1
APPLICATION NO.    : 12/431166
DATED              : October 19, 2010
INVENTOR(S)        : S. Christopher Gladwin It is certified that error appears in the above-identified patent and that said Letters Patent is hereby corrected as shown below:

Col. 15, line 20, in Claim 1: replace "lest" with --least--
Col. 16, line 15, in Claim 6: replace "lest" with --least--

Signed and Sealed this
Fourteenth Day of August, 2012

David J. Kappos
*Director of the United States Patent and Trademark Office*